United States Patent [19]

Bachle

[11] Patent Number: 5,147,126
[45] Date of Patent: Sep. 15, 1992

[54] DUAL LASER BEAM ANGULAR SEPARATION CONTROL APPARATUS

[75] Inventor: Wilfred H. Bachle, Orange, Calif.

[73] Assignee: The United States of America as represented by the Secretary of the Air Force, Washington, D.C.

[21] Appl. No.: 93,467

[22] Filed: Sep. 8, 1987

[51] Int. Cl.⁵ .................... G02B 27/14; G02B 26/08; G02B 26/10
[52] U.S. Cl. .................................. 359/862; 359/223; 359/618; 359/197
[58] Field of Search ............... 350/623, 618, 486, 484, 350/174, 172, 163, 6.8, 6.7, 6.6, 6.5, 6.1; 219/121 LS

[56] References Cited

U.S. PATENT DOCUMENTS

| | | |
|---|---|---|
| 2,407,687 | 9/1946 | Schwartz et al. |
| 3,257,924 | 6/1966 | Papke et al. |
| 3,396,626 | 8/1968 | Hughes |
| 3,695,749 | 10/1972 | Stapleton .......................... 350/163 |
| 3,730,625 | 5/1973 | Brayton ............................. 350/486 |
| 3,923,396 | 12/1975 | Ewald ................................ 356/17 |
| 3,935,419 | 1/1976 | Lambert et al. ............... 219/121 LS |
| 4,209,253 | 6/1980 | Hughes ............................. 356/152 |
| 4,367,009 | 1/1983 | Suzki ................................ 350/6.5 |
| 4,547,038 | 10/1985 | Mori ................................. 350/6.5 |

Primary Examiner—Jon W. Henry
Attorney, Agent, or Firm—Stanton E. Collier; Donald J. Singer

[57] ABSTRACT

A dual laser beam angular separation control apparatus has a pair of rotatable mirrored flats that minimize the angular separation of two converging beams such that the beam crossing aperture is also minimized and remains fixed at a specific point. The apparatus further minimizes the optical path length that is required to cause two parallel laser input beams to be converged to a minimum aperature size at crossing without the use of lens, etc.

1 Claim, 1 Drawing Sheet

DUAL LASER BEAM ANGULAR SEPARATION CONTROL APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates to dual beam laser devices, and, in particular relates to an apparatus used in the optical train thereof for controlling the angular separation of a pair of crossing laser beams.

One type of apparatus for causing parallel beams to cross is a conventional lens. One beam is input along the optical axis and crosses the focal point on the output side of the lens thereby. The other beam is input parallel to the optical axis but offset therefrom and as a result of the lens crosses the focal point also. The angular separation of the beams is determined by the perpendicular distance separating the input parallel beams and the focal length of the lens. To minimize the angular separation requires a very long focal length lens.

There are several disadvantages of a simple lens. The first disadvantage is that the lens has a fixed focal length and thus the crossing point cannot be varied irrespective of other factors. Additional lenses could be added but these would increase the optical path length, distortion, and loss of intensity. Another disadvantage is the lens has a thickness which inherently produces optical distortion on the output side. As related to the first disadvantage, one typically desires to minimize the length of any optical train because of distortion and vibrations in the components. Thus to reduce length, one would have to use short focal length lenses but when this is done the distortion is greatly increased because of the lens thickness and angular separation of the output beams at the focal point is increased. This increases the diameter of the aperture at the crossing point. Thus the desire to minimize angular separation and to minimize optical train length are clearly not realizable with the above apparatus.

These drawbacks have motivated a search for an apparatus that is able to minimize angular separation of the output beams and minimize the length of the optical train required to cross two parallel beams with minimum separation but not being coincident.

SUMMARY OF THE INVENTION

The present invention sets forth a dual laser beam angular separation control apparatus that overcomes the disadvantages as noted above.

The present invention includes a housing having a longitudinal void therethrough for attachment to a dual laser beam source on one end and a beam scanning source on the other end. Two parallel laser beams of different frequencies, for example, are input into the dual laser beam angular separation apparatus.

A central beam enters the dual laser beam angular separation device and leaves the dual laser beam angular separation device without change through an aperture. Inside said housing are a first and second mirrored optical flats that are pivoted and controlled by actuators located on the pivots thereof. The second flat is located near to the central beam with the pivot located also near the central beam. An outer beam being parallel to the central beam is twice reflected and caused to cross the central beam at the aperture noted above.

The outer beam is reflected off the first flat in an approximate perpendicular manner to the central beam. The first reflected beam then reflects off the second flat which causes that second reflected beam to cross the central beam at the aperture. The second flat is closely located next to the central beam to minimizes the angular separation between the central beam and the second reflected beam as they cross at the aperture point. The aperture point may be changed by adjusting the first and second mirrored flats.

It is therefore one object of the present invention to provide a dual laser beam angular separation control apparatus.

It is another object of the present invention to provide a means of minimizing optical path length when causing two parallel beams to cross at given point with a minimum of angular separation.

It is another object of the present invention to provide an apparatus that controls the separation between the laser beams which a lens system does not readily lend itself to control.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
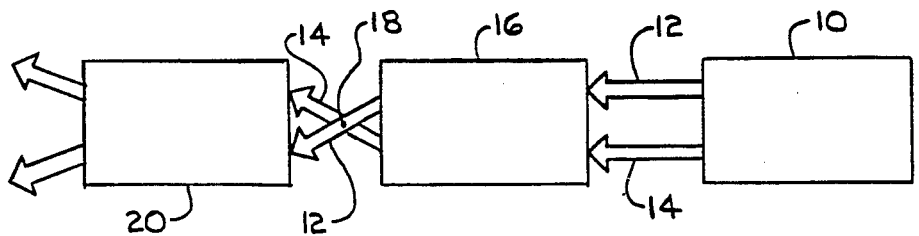
FIG. 1 illustrates by block diagram the present invention.

Referring to FIG. 1, a dual laser beam source 10 has two substantially parallel laser beams 12 and 14 output. Beams 12 and 14 are input into a dual laser beam angular separation control apparatus 16 that causes beams 12 and 14 to cross at an aperture point 18, the entrance pupil to the scanner, 20. The diameter of the aperture is controlled by the diameter D, 22, of the laser beams 12 and 14 and the angle $\theta$, 42, at which they cross at point 0, 18. Beams 12 and 14 are input into a beam scanning source 20 being conventional that causes beams 12 and 14 to be scanned across a given target, not shown, simultaneously to illuminate the target with two spots separated by virtue of the angle between the beams. The reflected laser energy from the two spots are received by a sensor that can detect the target and/or characterize it. The angular separation control apparatus is used to vary the spot spacing to produce a fine or coarse raster at the target as may be required for a particular function; i.e. detection or characterization.

Figure 2:
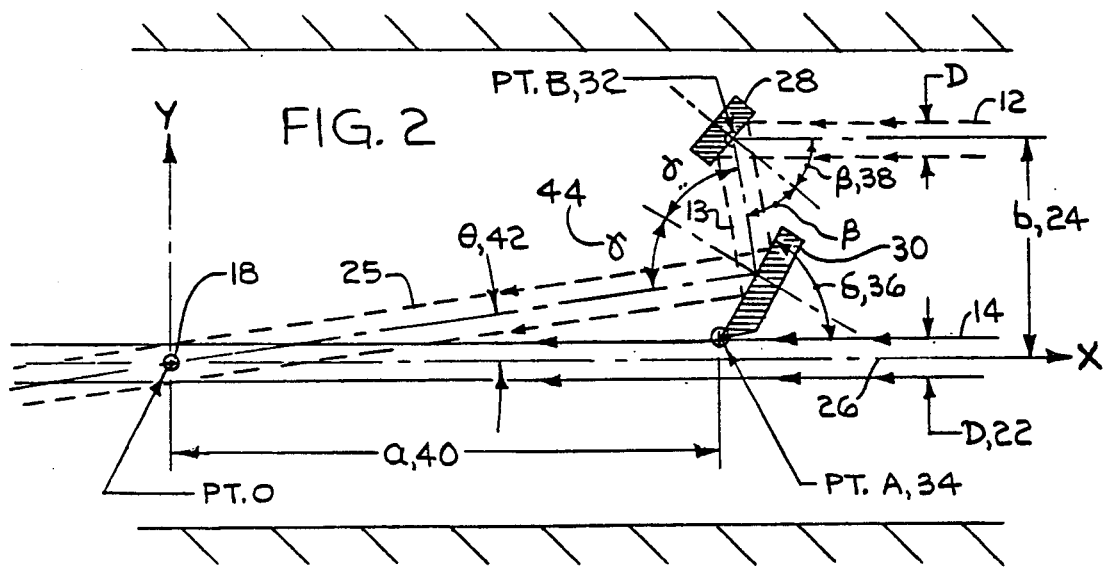
FIG. 2 illustrates the geometry of the present invention.

Referring to FIG. 2, beam 14 is central beam within dual laser beam angular separation apparatus 16. Beam 12 is the outer. As seen therein, beam 14 passes through apparatus 16 without deviation. Beam 14 has diameter D, 22, and travels along the negative x-axis of the coordinate system. Beam 12, being substantially parallel to beam 14, is a distance b, 24, from the axis 26 of beam 14. Beam 12 firstly reflects off a first flat 28 to form a first reflected beam 13 and then reflects off a second flat 30 to form a second reflected beam 25. Flat 28 is pivoted about a point B, 32, and flat 30 is pivoted about a point A, 34. Both flats are controlled by pivots with stepper motors thereon whereby angles δ, 36, and β, 38, can be selected to adjust the point 0, 18, a distance a, 40, from point A, 34. θ, 42, is the angle that second reflected beam 25 makes with beam 14. δ, 44, is one half the angle between the first reflected beam 13 and second reflected beam 25 made upon reflecting off second flat 30.

The distance a, 40, is controlled by moving flats 28 and 30 according to the following equation:

$$\frac{\tan \theta - \tan (\pi + \theta - 2\gamma)}{\tan (\pi/2 + \theta - \gamma) - \tan \theta} =$$

$$\frac{b - (a + D/2) \tan (\pi + \theta - 2\gamma)}{a \tan (\pi/2 + \theta - \gamma) - D/2}$$

The minimum value for a, 40, is given by θ, 42, a minimum. The value of γ, 44, is determined from the above equation by mathematical iteration. The angle δ, 36, is equal to $\pi/2 + \theta - \gamma$ and β, 38, is equal to $\gamma - \theta/2$.

Figure 3:
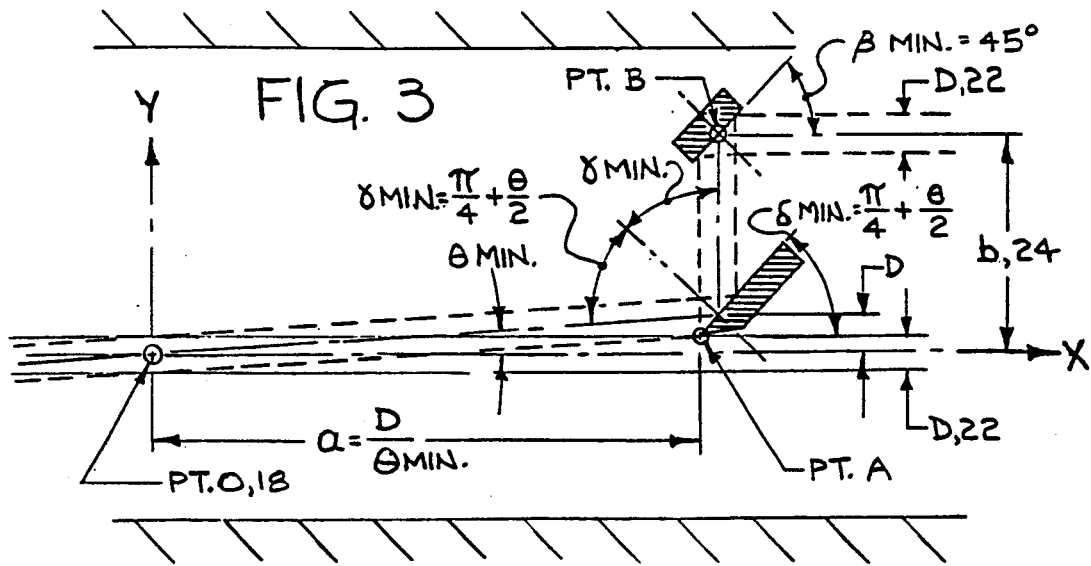
FIG. 3 illustrates the geometry of a minimum angle of convergence.

Referring to FIG. 3, a minimum beam angular separation geometry is shown.

Clearly, many modifications and variations of the present invention are possible in light of the above teachings and it is therefore understood, that within the inventive scope of the inventive concept, the invention may be practiced otherwise than specifically claimed.

What is claimed is:

1. A dual laser beam angular separation control apparatus, said dual laser beam separation control apparatus connected between a dual laser beam source and a beam scanning apparatus, said dual laser beam angular separation control apparatus comprising:
    a housing, said housing having a longitudinal cavity therethrough;
    said dual laser beam source outputting a pair of substantially parallel laser beams, one beam being a central beam and the other beam being the outer beam, said beams being input into said longitudinal cavity of said housing;
    a first mirrored flat, said first mirrored flat being rotatably mounted within said housing;
    a second mirrored flat, said second mirrored flat being rotatably mounted within said housing;
    means for selectively rotating said mirrors
    said outer beam entering said housing and reflecting off said first mirrored flat to form a first reflected beam, said first reflected beam reflecting off said second mirrored flat to form a second reflected beam, said second reflected beam converging with said central beam at an angle θ and said second reflected beam and said central beam crossing at an aperture point;
    said first and said second mirrored flat, said central beam and said outer beam, and said aperture point being positionally connected by the equation:

$$\frac{\tan \theta - \tan (\pi + \theta - 2\gamma)}{\tan (\pi/2 + \theta - \gamma) - \tan \theta} =$$

$$\frac{b - (a + D/2) \tan (\pi + \theta - 2\gamma)}{a \tan (\pi/2 + \theta - \gamma) - D/2}$$

wherein:
    θ is the angle between the central beam and the second reflected beam at the aperture point;
    γ is one half the angle between the first reflected beam and the second reflected beam at said second mirrored flat;
    b is the distance between an outer beam axis and a central beam axis;
    D is the diameter of said outer and said central beam;
    a is the distance from the aperture point to the pivot of said second mirrored flat: whereby
    said first mirrored flat is oriented at an angle β from a horizontal line being the same as the outer beam axis, β equals γ minus θ/2;
    said second mirrored flat is oriented at an angle δ from a horizontal line being the same as the central beam axis, δ equals π/2 plus θ minus γ;
    said δ and β being determined by a θ minimum having a, b, and D as parameters:
    said variables and parameters being selected to minimize θ and minimize an aperture at said aperture point where said beams cross.

* * * * *